(12) United States Patent
Emenaker et al.

(10) Patent No.: US 8,957,672 B2
(45) Date of Patent: Feb. 17, 2015

(54) BEARING CHECK FIXTURE

(75) Inventors: Nicolas E. Emenaker, Hamilton, OH (US); Aaron J. Schradin, Holland, MI (US)

(73) Assignee: Armick, Inc., Grand Rapids, MI (US)

( * ) Notice: Subject to any disclaimer, the term of this patent is extended or adjusted under 35 U.S.C. 154(b) by 926 days.

(21) Appl. No.: 13/153,652

(22) Filed: Jun. 6, 2011

(65) Prior Publication Data

US 2012/0306478 A1    Dec. 6, 2012

(51) Int. Cl.
*G01B 7/14*   (2006.01)
*G01B 5/14*   (2006.01)

(52) U.S. Cl.
CPC .................................... *G01B 5/146* (2013.01)
USPC ............ 324/207.23; 324/207.15; 324/207.13; 324/207.11; 324/207.21; 324/207.25

(58) Field of Classification Search
CPC .................................. G01B 7/023; G01B 7/14
USPC ................ 416/114; 324/205, 207.15, 207.13, 324/207.2, 207.11, 207.21
See application file for complete search history.

(56) References Cited

U.S. PATENT DOCUMENTS

| 5,026,254 | A  | * | 6/1991 | Ford et al. ........................ 416/61 |
| 5,624,232 | A  | * | 4/1997 | Certain ........................ 416/114 |
| 7,023,117 | B2 | * | 4/2006 | Fremerey ...................... 310/90.5 |
| 7,524,169 | B2 | * | 4/2009 | Podgurski ................. 416/168 R |
| 8,230,718 | B2 | * | 7/2012 | Swadling et al. .................... 73/7 |

OTHER PUBLICATIONS

"Radial Axial Bearing Measurement Tool" (walintools.com/?page_id=34), Walin Tools, LLC, last visited Jun. 9, 2011.

\* cited by examiner

*Primary Examiner* — Tung X Nguyen
*Assistant Examiner* — Alesa Allgood
(74) *Attorney, Agent, or Firm* — Warner Norcross & Judd LLP

(57) ABSTRACT

A hand-held check fixture to indicate excessive play in a pitch change link ball joint is provided. The check fixture can include a first member for attachment to a first portion of the pitch change link, a second member for attachment to a second portion of the pitch change link, and a gage to indicate movement of the first member relative to the second member. The gage is adapted to indicate the clearance between a pitch change link ball bearing and a pitch change link knuckle in the axial direction and/or in the radial direction. The check fixture can assist in evaluating the flightworthiness of each pitch change link on a rotor assembly with relative ease and without requiring the complete removal of each pitch change link from the rotor assembly.

17 Claims, 11 Drawing Sheets

BEARING CHECK FIXTURE

BACKGROUND OF THE INVENTION

The present invention relates to a check fixture for a spherical bearing, and more particularly to a hand-held check fixture for a spherical bearing in a helicopter pitch change link.

Helicopter rotor assemblies typically include a series of pitch change links (sometimes referred to as pitch links) for controlling the pitch of the rotor blades. The pitch change links can extend between an upper swashplate and a rotor blade hub. During use, a pitch change link generally supports compressive loads and tensile loads exerted by the upper swashplate. As the position and attitude of the upper swashplate varies, the pitch of each rotor blade also varies. In fully articulating rotor assemblies, the pitch of each rotor blade varies rapidly to generate both aerodynamic lift and aerodynamic thrust.

Pitch change links are typically threaded at one end and include a ball joint at the other end. The ball joint can include a ball bearing seated within a knuckle. The ball bearing is generally seated securely within the knuckle with a limited clearance between the ball bearing and the knuckle. Over the normal use of a pitch change link, the ball joint can develop an excessive clearance between the ball bearing and the knuckle, causing the ball bearing to repeatedly impact the knuckle during flight. As a result, the pitch change link can wear outside of acceptable limits, in many instances made worse by the exposure of the ball joint to moisture and blowing sand or dust. This wear can affect overall helicopter flight handling characteristics, and can cause erratic or unpredictable behavior of the airframe during flight operations.

As a result, the pitch change link is normally subject to periodic inspection. A typical inspection can include removing the pitch change link from the rotor assembly, examining the ball joint for excessive play, and reinstalling the pitch change link. According to current methods for inspection, the pitch change link is normally removed and reinstalled at both ends, that is, at the ball joint and at the threaded end portion. In addition, the removal of the pitch change link from the helicopter can in many instances require added evaluations and/or recertifications before the helicopter can return to flight operations.

While periodic inspection of the pitch change link can be an effective method of detecting excessive play between the ball and the knuckle, current methods of inspection are time consuming and involve the disassembly and removal of the entire pitch change link from the rotor assembly. Accordingly, there remains a need for an improved system for inspecting pitch change links. In particular, there remains a need for an improved system to quickly and effectively detect excessive play in a pitch change link ball joint.

SUMMARY OF THE INVENTION

A hand-held check fixture to indicate excessive play in a pitch change link is provided. The check fixture can include a first member for attachment to a first portion of the pitch change link, a second member for attachment to a second portion of the pitch change link, and a gage to indicate movement of the first member relative to the second member. In some embodiments, the gage is adapted to indicate the clearance between the pitch change link ball and the pitch change link knuckle in predominantly the axial direction. In other embodiments, the gage is adapted to indicate the clearance between the pitch change link ball and the pitch change link knuckle in predominantly the radial direction. In these embodiments, the check fixture can assist in evaluating the flightworthiness of each pitch change link on a rotor assembly with relative ease and without requiring the complete removal of each pitch change link from the rotor assembly.

In one embodiment, the hand-held check fixture includes a first member for removable attachment to a pitch change link knuckle, a second member for removable attachment to a pitch change link ball bearing, and a gage for indicating relative axial movement between the first and second members. The first member can include one or more magnets for releasable attachment to the knuckle, while in other embodiments the first member can include threaded holes, pins or sockets, particularly where the knuckle is formed of aluminum or other non-ferrous metals. The second member can include a rod urged into alignment within a ball aperture. In use, the gage can indicate the clearance between the ball bearing and the knuckle in predominantly the axial direction.

In another embodiment, a method is provided for evaluating the play in a pitch change link ball joint in the axial direction. The method includes disconnecting a pitch change link ball joint from a rotor assembly for attachment to a check fixture. The method further includes releasably coupling a first portion of the check fixture to a pitch change link knuckle, releasably coupling a second portion of the check fixture to a pitch change link ball bearing, and applying pressure against the ball bearing in predominantly the axial direction. A gage associated with the check fixture can indicate the play between the ball bearing and the knuckle. The method can include reattaching the pitch change link ball joint to the rotor assembly. The above steps can be repeated for the remaining pitch change links on a rotor assembly without requiring their complete removal.

In still another embodiment, the hand-held check fixture includes a first member for removable attachment to a pitch change link stem, a second member for removable attachment to a pitch change link ball bearing, and a gage for indicating relative radial movement between the first and second members. The first member can include one or more magnets for releasable attachment to the stem. The second member can include a rod extending through a ball aperture in the axial direction. In use, the gage can indicate the play between the ball bearing and the knuckle in predominantly the radial direction.

In another embodiment, a method is provided for evaluating the play in a pitch change link ball joint in the radial direction. The method includes disconnecting a pitch change link ball joint from a rotor assembly for attachment to a check fixture. The method further includes releasably coupling a first portion of the check fixture to a pitch change link stem, releasably coupling a second portion of the check fixture to a pitch change link ball bearing, and applying pressure against the ball bearing in predominantly the radial direction. A gage associated with the check fixture can indicate the play between the ball bearing and the knuckle. The method can include reattaching the pitch change link ball joint to the rotor assembly. The above steps can be repeated for the remaining pitch change links on a rotor assembly without requiring their complete removal.

Embodiments of the invention can therefore provide an improved check fixture to indicate excessive play in a pitch change link joint. The check fixture can streamline an inspection process that might otherwise include the complete removal and evaluation of each individual pitch change link from the rotor assembly. Embodiments of the invention also provide an unobtrusive, durable and simple-to-use check fixture for integration into helicopter flightline maintenance, while also achieving short- and long-term cost savings in terms of manpower, facility usage, helicopter down-time and subsequent flight testing.

These and other advantages and features of the invention will be more fully understood and appreciated by reference to the description of the current embodiments and the drawings.

DESCRIPTION OF THE CURRENT EMBODIMENTS

The current embodiments relate to a check fixture for a pitch assembly. The check fixture generally includes a gage configured to indicate relative movement between first and second portions of a pitch change link. For illustrative purposes, the check fixture is described in connection with a pitch change link for a four-blade articulating rotor assembly. It should be noted however that the check fixture of the present invention can be suitably adapted for use across a wide variety of applications with a wide variety of ball bearing assemblies, whether now known or hereinafter developed.

Figure 1:
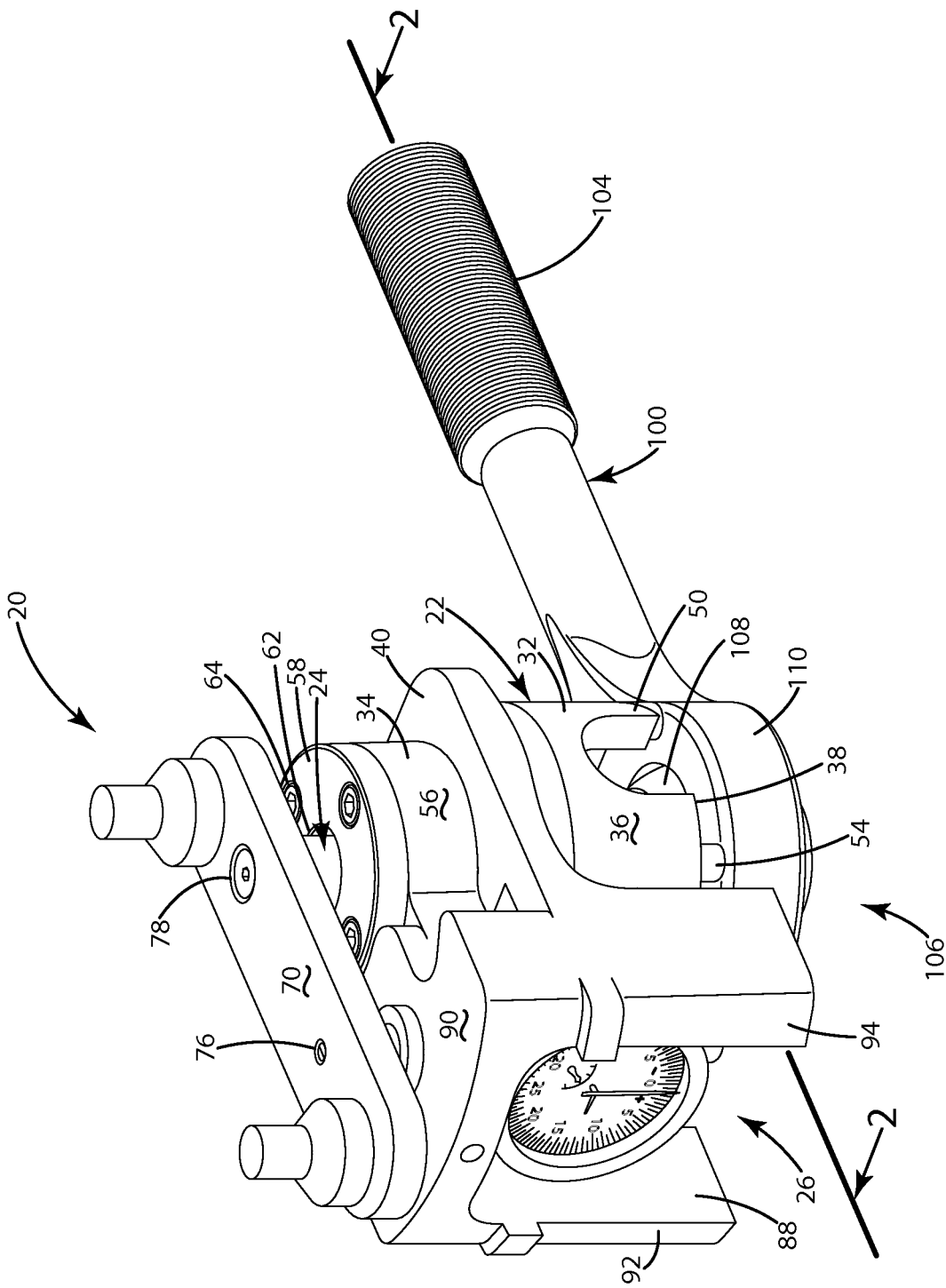
FIG. 1 is a perspective view of a check fixture for a pitch change link in accordance with a first embodiment.
Figure 2:
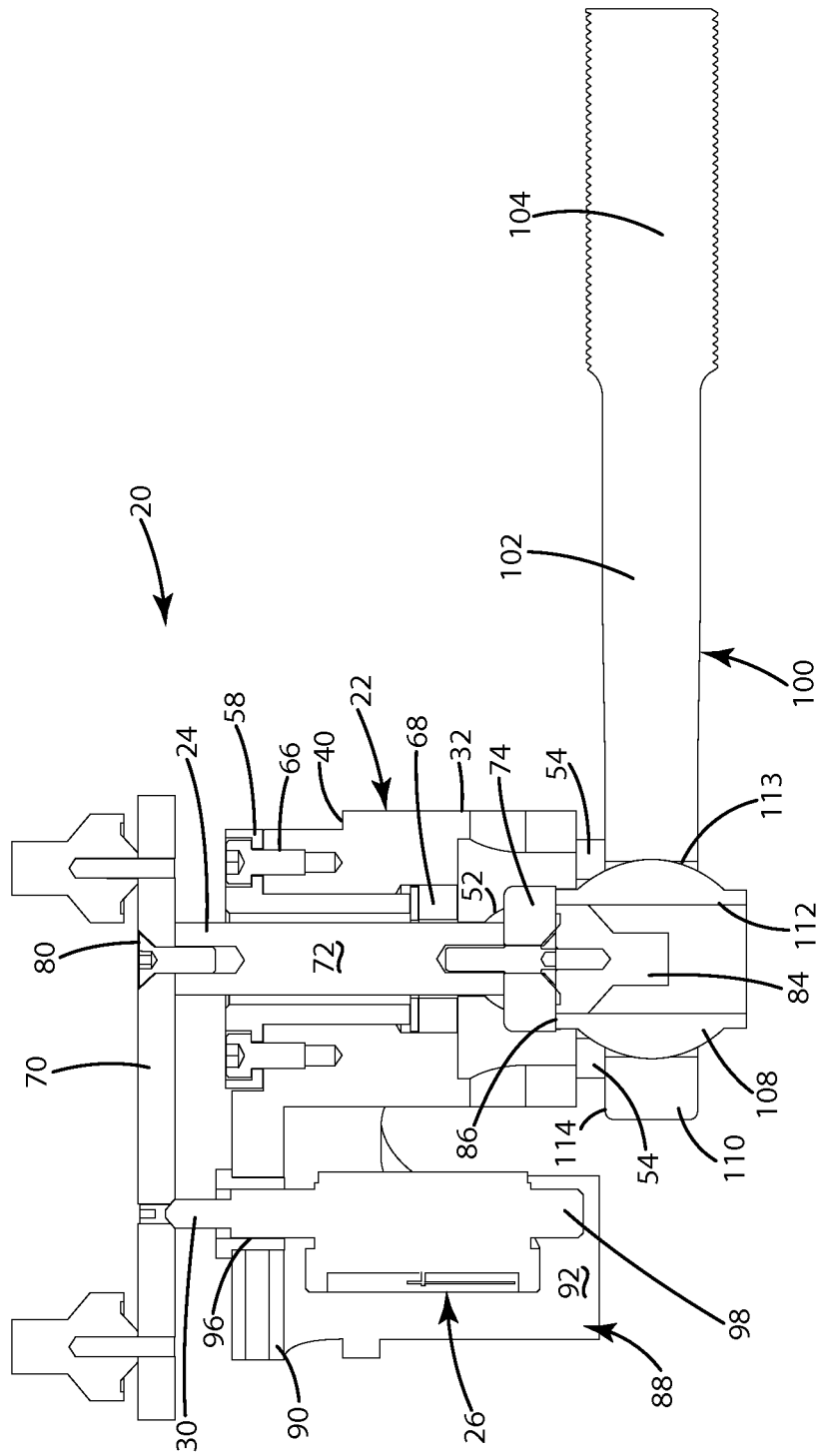
FIG. 2 is a cross-sectional view of the check fixture of FIG. 1 taken along line 2-2 in FIG. 1.
Figure 3:
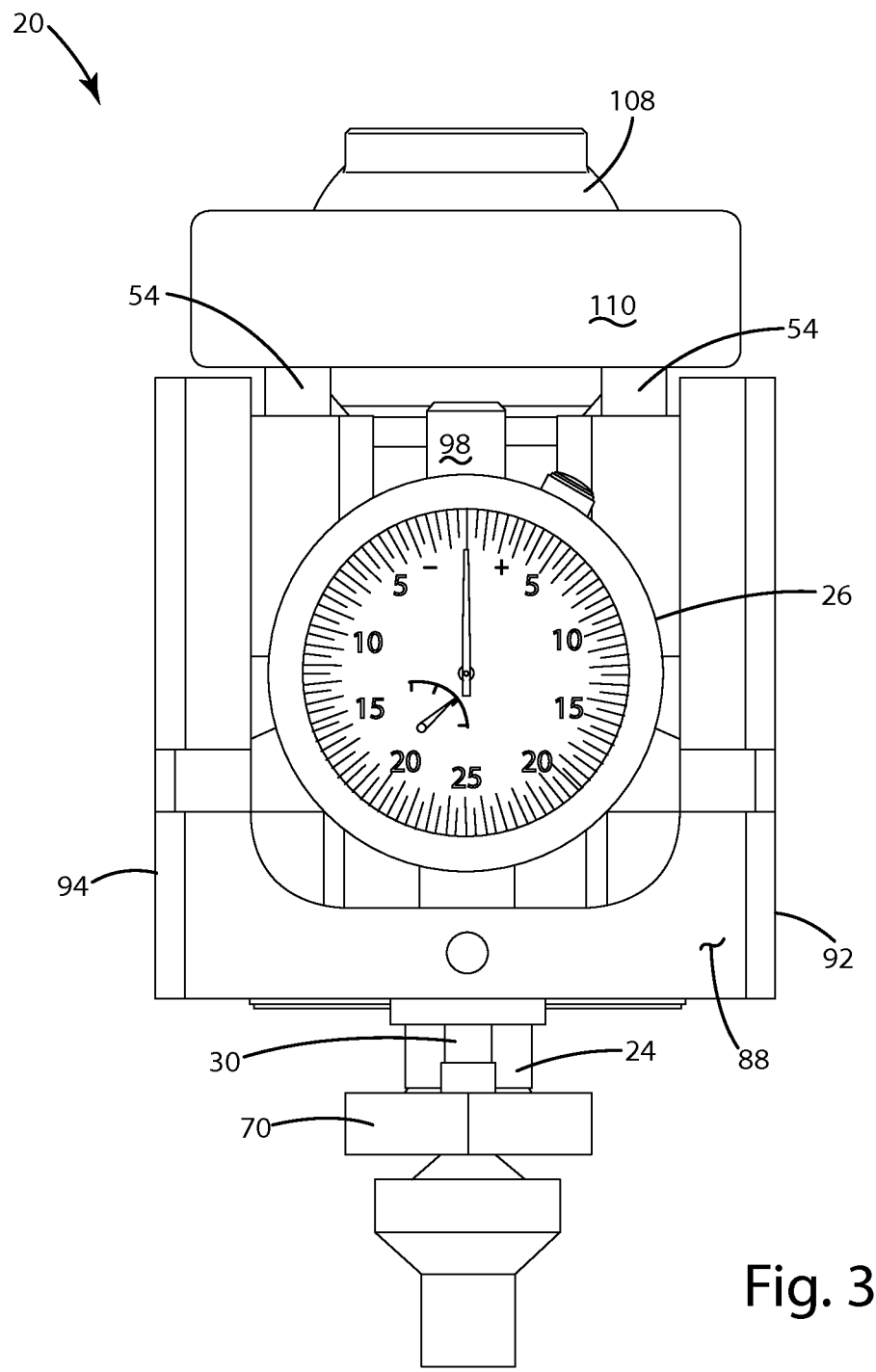
FIG. 3 is a front view of the check fixture of FIG. 1.

In accordance with a first embodiment of the invention, a check fixture for a pitch change link is shown in FIGS. 1-3 and generally designated 20. A suitable pitch change link 100 is shown as including a stem 102 extending between a threaded end portion 104 and a ball joint 106. The ball joint 106 includes a spherical ball bearing 108 seated within a knuckle 110. The ball bearing 108 rotates freely with respect to the knuckle 110 and defines an aperture 112 for attachment to a bolt, which is itself connectable to a rotor hub or to a swashplate. As noted above, the check fixture 20 can be used with other pitch change links and/or other bearing assemblies without departing from the scope or content of the present invention.

The pitch change link 100 having been briefly described, the check fixture 20 is generally configured to measure the axial clearance between the ball bearing 108 and the knuckle 110. While at least some clearance is desired to facilitate rotation of the ball bearing 108 with respect to the knuckle 110, excessive clearance can cause the ball bearing 108 to repeatedly impact the knuckle 110 during flight. To determine the axial clearance, the check fixture 20 includes a first member 22 for attachment to the knuckle 110, a second member 24 for attachment to the ball bearing 108, and a gage 26 for indicating axial movement of the first member 22 with respect to the second member 24. The first member 22 can be fixed with respect to the gage body 28, and the second member 24 can be fixed with respect to the gage actuator 30. Movement of the ball bearing 108 with respect to the knuckle 110 corresponds to movement of the actuator 30 with respect to the indicator body 28. The resulting axial displacement is indicated on the gage 26 to ultimately assist in evaluating whether the pitch change link 100 is suitable for use in the rotor assembly.

As shown in FIGS. 1-3, the first member 22 is generally cylindrical and includes a lower portion 32 and an upper portion 34. As explained in greater detail below, the lower portion 32 and the upper portion 34 cooperatively define an elongate channel to accommodate the second member 24. The lower portion 32 generally includes a sidewall 36 extending between a lower periphery 38 and an upper periphery 40. The sidewall 36 can include oppositely disposed arcuate portions 42, 44 and oppositely disposed planar portions 46, 48. The arcuate portions 42, 44 can each define a notched opening 50, 52 extending upwardly from the lower periphery 38. In addition, multiple permanent magnets 54 can extend downwardly from the lower periphery 38 to magnetically couple the first member 22 to a knuckle 110. While four permanent magnets 54 are shown, any number of magnets can be utilized. In other embodiments, however, a non-magnetic element can secure the first member 22 to the knuckle 110. For example, the check fixture 20 can include a clamp, a strap or other suitable mechanism to secure the first member 22 to the knuckle 110. In still other embodiments, the check fixture 20 can include threaded holes, pins or sockets to secure the first member 22 to the knuckle 110, particularly where the knuckle 110 is formed of aluminum or other non-ferrous metals.

As noted above, the first member 22 includes a generally cylindrical upper portion 34. The upper portion 34 can include an annular sidewall 56, a head plate 58 and a biasing mechanism 60. The annular sidewall 56 can define an outer diameter dimensioned to fit within the lower sidewall 36. The head plate 58 can be spaced apart from the lower sidewall 36 and can extend across the upper sidewall 56. As perhaps best shown in FIG. 3, the head plate 58 defines an interior aperture 62 and multiple countersunk openings 64. The interior aperture 62 can include a diameter at least slightly greater than the diameter of the second member 24. The openings 64 can be disposed outwardly from the interior aperture 62 for alignment with corresponding opening 66 in the upper sidewall 56. In addition, multiple threaded fasteners 67 can secure the head plate 58 to the upper annular sidewall 56, with each fastener 67 being received within the head plate 58 and in the upper sidewall 56. The biasing mechanism 60 can be secured to the head plate 58 to urge the second member 24 downwardly toward the pitch change link 100. As shown in FIGS. 1-3, the biasing mechanism 60 can include a first ring magnet 68 disposed generally midway between the lower periphery 38 and the upper periphery 40. While only a single magnet 68 is shown, the biasing mechanism 60 can include two or more magnets to downwardly urge the second member 22. The biasing mechanism 60 can alternatively include any suitable device for biasing the second member 24, including a mechanical spring, for example.

The second member 24 is moveable with respect to the first member 22 and can include a beam 70, a linear slide 72 and a magnet 74. The beam 70 operatively couples the gage 26 to the linear slide 72. In one configuration, the beam 70 includes a generally rectangular cross-section defining a first aperture 76 for the gage actuator 30 and a second aperture 78 for the linear slide 72. As shown in FIG. 2, the second aperture 78 can be countersunk to define a boss for a threaded fastener 80. The fastener 80 can extend through the boss 78 and into a corresponding boss 82 in the linear slide 72. The slide 72 can extend downwardly through the first member 22 and terminate in a frusto-conical head 84. The frusto-conical head 84 can be sized to only partially interfit within the pitch change link aperture 112. In addition, the head 84 or magnet 74 can define a radial lip 86 to limit downward movement of the magnet 74. As shown, the lower magnet 74 is an axially polarized ring magnet, and is spaced apart from the upper magnet 68. The magnets 68 and 74 are coaxial and define a repulsive magnetic field therebetween. Accordingly, the upper magnet 68 is operative to bias the lower magnet 74, and thus the second member 24, downward toward the pitch change link 100. As a result, the head 84 is urged against the pitch change link ball bearing 108. In this position, the lower magnet 74 outer axial surface is magnetically coupled to the pitch change link ball bearing 108. In alternative embodiments the biasing mechanism 60 can instead include a spring, such as a mechanical spring wound about the linear slide 72. In these alternative configurations, the slide 72 may or may not include a lower magnet 74. Instead, the spring can press downwardly against the lip 86, and therefore the slide 72, to urge the second member 24 toward the pitch change link 100.

As noted above, the gage 26 can include a suitable indicator for measuring a displacement. While shown as including an analog display, the gage 26 can alternatively include a digital display, for example an LCD display. Optionally, the gage 26 includes a plunger-type actuator 30. In other embodiments, the gage 26 can include a lever actuator, a vernier actuator, or other suitable actuator. In addition, the gage 26 can be secured within a cradle 88 which can in turn be secured to the first member 22. For example, the cradle 88 can include an upper sidewall 90 and left and right vertical sidewalls 92, 94. The upper sidewall 90 can define an aperture 96 sized to receive the gage 26 by interference fit. In addition, left and right sidewalls 92, 24 can extend rearwardly, being joined to the first member 22 to prevent relative movement therebetween. In this configuration, the plunger-actuator 30, the beam 70 and the second member 24 move axially in unison relative to the gage 28 and the first member 22.

A method for evaluating the axial play or clearance between a ball bearing 108 and a knuckle 110 can include disconnecting the ball socket 106 from the rotor assembly. Optionally, the threaded end portion 104 can remain secured to the rotor assembly. The check fixture 20 can be positioned over the ball socket 106 as generally shown in FIGS. 1-3. In particular, the external first member 22 can be magnetically joined to the knuckle face 114, and the internal second member 24 can be magnetically joined to the ball bearing 108 and aligned with the ball bearing aperture 112. Once the check fixture 20 is properly positioned over the ball socket 106, the biasing mechanism 60 or upper magnet 68 can urge the second member 24 downwardly against the ball bearing 108, resulting in the ball bearing 108 being urged into abutment with a lower portion of the knuckle 110 or knuckle race 113. In this position, the gage 26 can be zeroed, optionally with manipulation of the dial 98. By then applying pressure against the ball bearing 108 opposite the check fixture 20, the ball bearing 108 can translate upwardly, being urged into abutment with an upper portion of the knuckle 110 or knuckle race 113. As a result, the linear slide 72 can recede a corresponding distance within the check fixture 20, prompting an upward displacement of the gage actuator 30. The gage 26, if properly zeroed, can reveal displacements on the order of ten-thousandths of an inch (1.0 E-4 inches) or smaller. Once pressure on the ball bearing 108 is released, the biasing mechanism 60 or upper magnet 68 can return the ball bearing 108 into abutment with the lower portion of the knuckle 110 or knuckle race 113. Optionally, the above steps can be repeated to confirm the proper positioning and alignment of the check fixture 20. If the play or clearance between the ball bearing 108 and the knuckle 110 are determined to be within acceptable levels, the check fixture 20 can be removed from the pitch change link 100 by hand, and the pitch change link 100 can be reconnected to the rotor assembly. Advantageously, the evaluation can be performed while the pitch change link 100 remains otherwise secured to the rotor assembly. The check fixture 20 can therefore reduce the time to evaluate each of the eight pitch change links 100 in a four-blade rotor assembly, for example In some instances, the pitch change link ball socket 106 (or other bearing implementation) might reveal an excessive clearance more readily in response to an axial measurement than a radial measurement, while in other instances the pitch change link ball socket 106 might reveal an excessive clearance more readily in a radial measurement than an axial measurement. In these instances, only a single series of measurements may be desirable, while in other instances both axial and radial measurements may be desirable.

In accordance with a second embodiment of the invention, a check fixture for a pitch change link is shown in FIGS. 4-11 and generally designated 200. The check fixture 200 can be adapted to measure the radial clearance between components of a pitch change link 100. That is, the check fixture 200 can include a gage 202 configured to indicate relative radial movement in a pitch change link ball socket 106. Similar to the manner described above in connection with the first embodiment, the check fixture 200 can be used to promptly inspect the pitch change link 100 without requiring its complete removal from the rotor assembly and without significant effort.

Referring now to FIGS. 4-11, the check fixture 200 includes a first member 204 for attachment to the pitch change link stem 102, a second member 206 for attachment to the pitch change link ball bearing 108, and a gage 202 for indicating radial movement of the second member 206 with respect to the first member 204. The first member 204 can be fixed with respect to the gage body 208, and the second member 206 can be fixed with respect to the gage actuator 210 or plunger arm. Axial movement of the ball 108 within the knuckle 110 can therefore correspond to movement of the gage actuator 210 relative to the gage body 208. The resulting radial displacement can be indicated on the gage 202 to ultimately assist in evaluating whether the pitch change link 100 is suitable for use in the rotor assembly.

The first member 204 can generally include any suitable attachment device to releasably couple the pitch change link stem 102 to the first member 204. In particular, the first member 204 can include any suitable attachment device adapted to restrain movement of the pitch change link stem 102 relative to the first member 204 in one or both of the axial direction and the radial direction. In the illustrated embodiment, the first member 204 includes a forked attachment arm 212 that, when closed, tightly engages the pitch change link stem 102 to prevent relative radial and axial movement therebetween, optionally with the aid of one or more high friction surfaces or pads to bear against the pitch change link stem 102. The forked attachment arm 212 is generally illustrated in the closed position in FIG. 4, and includes a longitudinal recess 214 for receipt of a rotatable locking pin 216. In use, the attachment arm 212 can be pivoted upwardly to the closed position about the pitch change link stem 102. Once in the closed position, the locking pin 216 can be pivoted downwardly to be slideably received within the longitudinal recess 214. The locking pin 216 can be hingedly supported at a first end by the first member 204 and can include an oversized anchor 218 at a second end. In one embodiment, the anchor 218 can be threadably joined to the locking pin 216, tightly bearing against a lower surface of the attachment arm 212 in the closed position in response to a clockwise or counter-clockwise rotation of the anchor 218. In another embodiment, the anchor 218 can be joined to the locking pin 216 through an internal tension spring. In this configuration, the anchor 218 can be axially retracted from the locking pin 216 as the locking pin 216 pivots downwardly into the forked recess 214. When the locking pin 216 is received within the attachment arm 212, the tension spring can bias the anchor 218 upwardly to tightly bear against a lower surface of the attachment arm 212, thereby restraining the check fixture 200 against the pitch change link stem 102. To remove the check fixture 200, the anchor 218 can first be retracted from the locking pin 216, and the locking pin 216 can then pivot upwardly from the forked attachment arm 212. The forked attachment arm 212 is then free to pivot downwardly from the pitch change link stem 102, and the check fixture 200 can be lifted from the pitch change link 100 by hand or other suitable implement. While described as including a forked attachment arm 212 and a locking pin 216, the first member 204 can also or alternatively one or more magnets, rods, clamps, straps and combinations thereof to restrain movement of the first member 204 relative to the pitch change link stem 102 in one or both of the axial direction and the radial direction.

Figure 10:
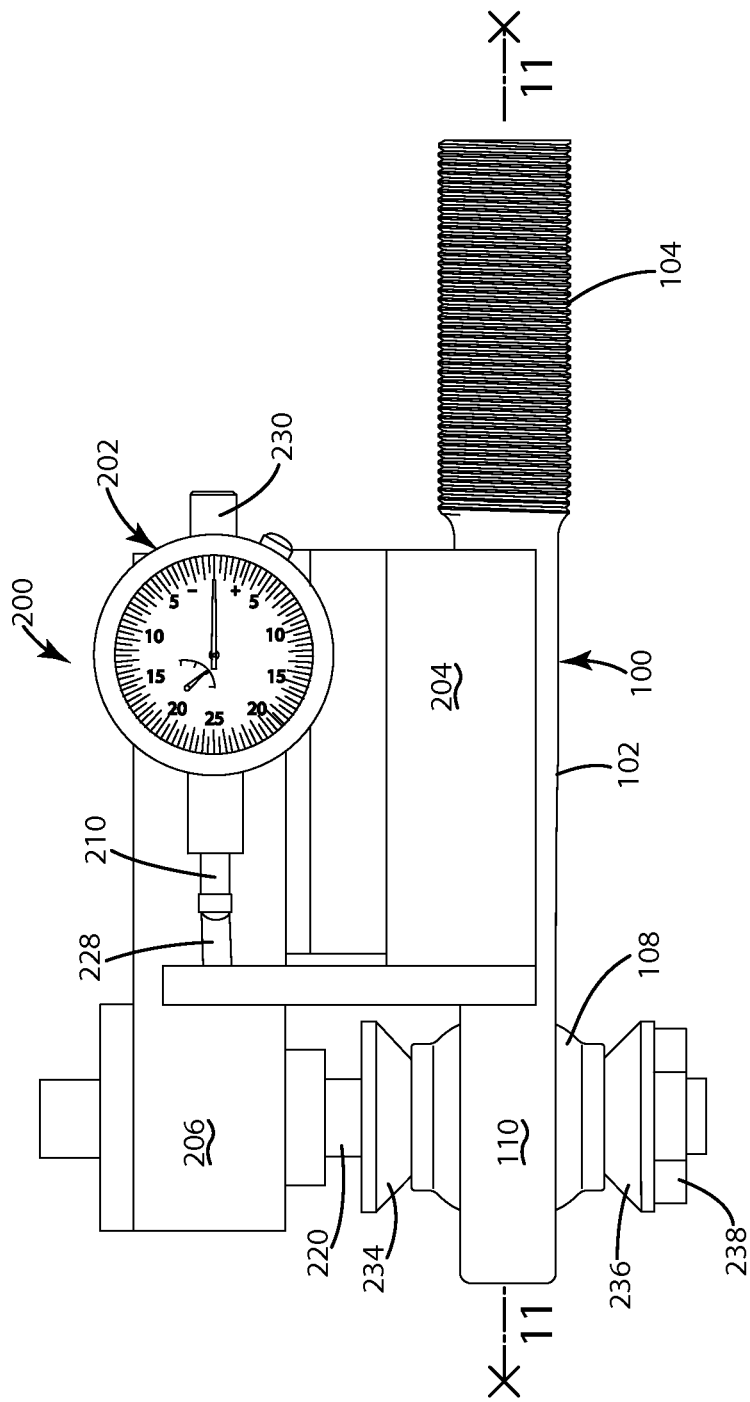
FIG. 10 is a side elevational of a check fixture illustrating opposing conical heads for a pitch change link ball bearing.
Figure 11:
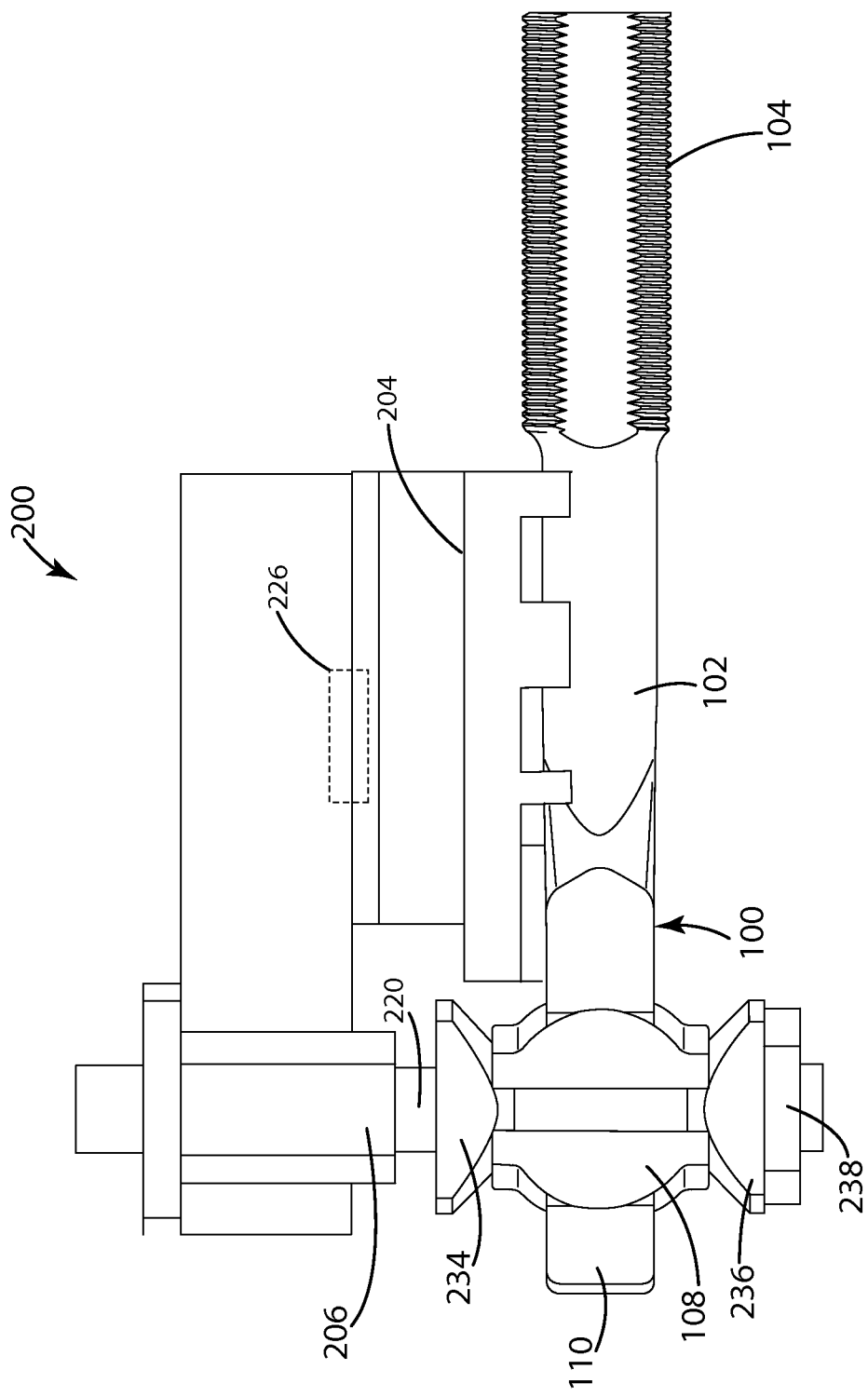
FIG. 11 is a cross-sectional view of the check fixture of FIG. 10 taken along line 11-11 in FIG. 10.

The second member 206 can also include an attachment device to releasably couple the ball bearing 108 to the second member 206. In particular, the second member 206 can include any suitable attachment device adapted to restrain movement of the ball bearing 108 relative to the second member 206 in one or both of the axial direction and the radial direction. In the illustrated embodiment, the second member 206 includes a rod 220 extending through and tightly inter-fitting with the ball bearing aperture 112. Optionally, the rod 220 can be formed of a resilient material and can be slightly oversized relative to the ball bearing aperture 112 to prevent relative movement in the radial and axial directions. Further optionally, the rod 220 can include coaxial frusto-conical heads 234, 236 on opposite axial ends of the ball bearing 108 to impede movement of the ball bearing 108 in the axial direction (i.e., perpendicular to the longitudinal axis 116). As shown in FIGS. 10-11 for example, the upper head 234 can optionally be fixed to the rod 220, and the lower head 236 can optionally be removably-threadably mounted about the rod 220. An internally threaded locking nut 238 can be threadably mounted about the rod 220 to bear upwardly against the lower head 236, thereby urging the heads 234, 236 together on opposing sides of the ball bearing 108. While described in connection with the embodiment of FIGS. 4-11, the opposing heads 234, 236 can also be utilized in connection with other embodiments including the embodiment illustrated in connection with FIGS. 1-3. For example, the check fixture 20 of FIGS. 1-3 can include a opposing frusto-conical heads that bear against opposing sides of the ball bearing 108 to limit relative axial and/or radial movement of the check fixture 20 relative to the ball bearing 108.

Figure 5:
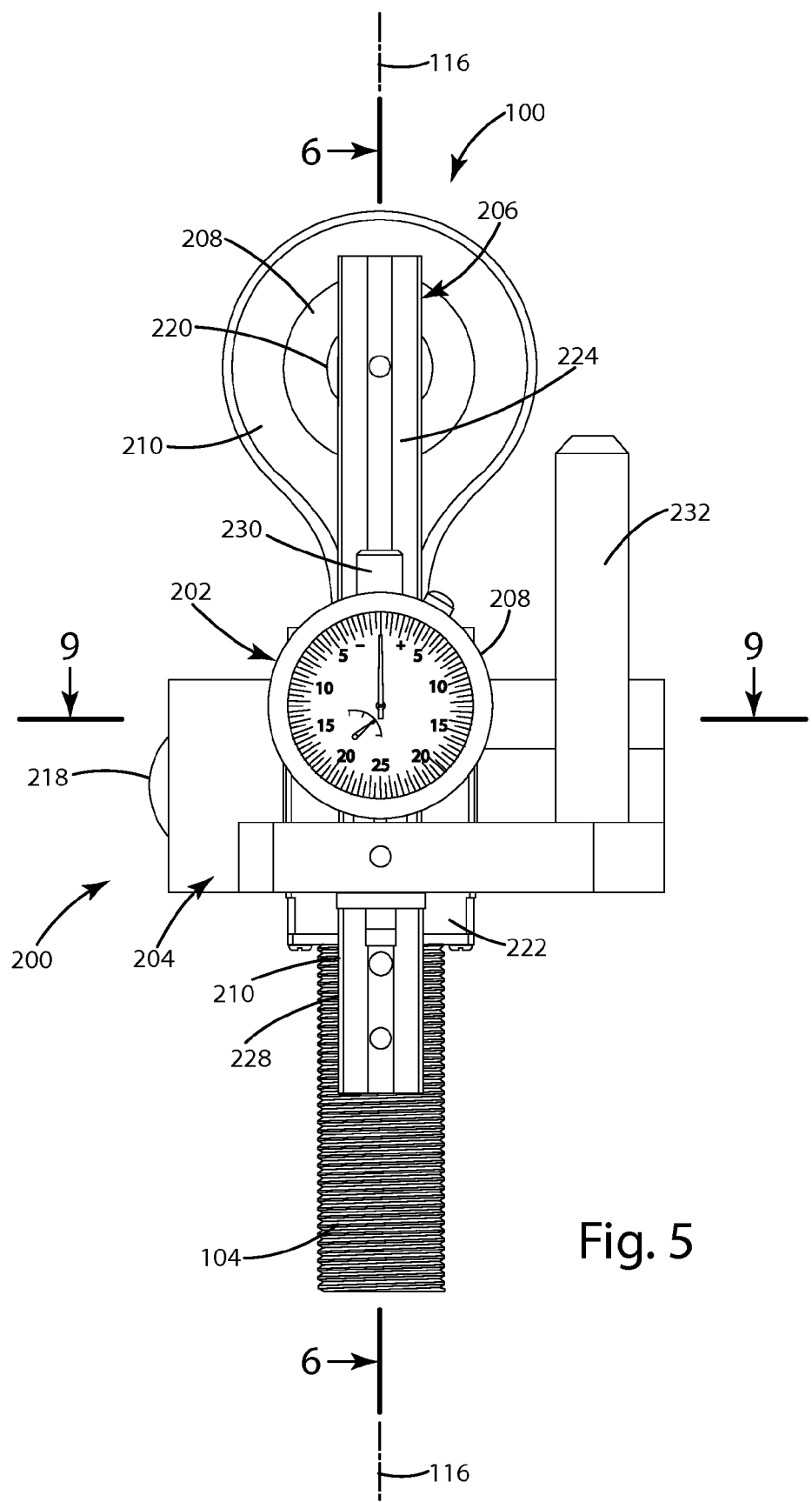
FIG. 5 is a top elevational view of the check fixture of FIG. 4.
Figure 6:
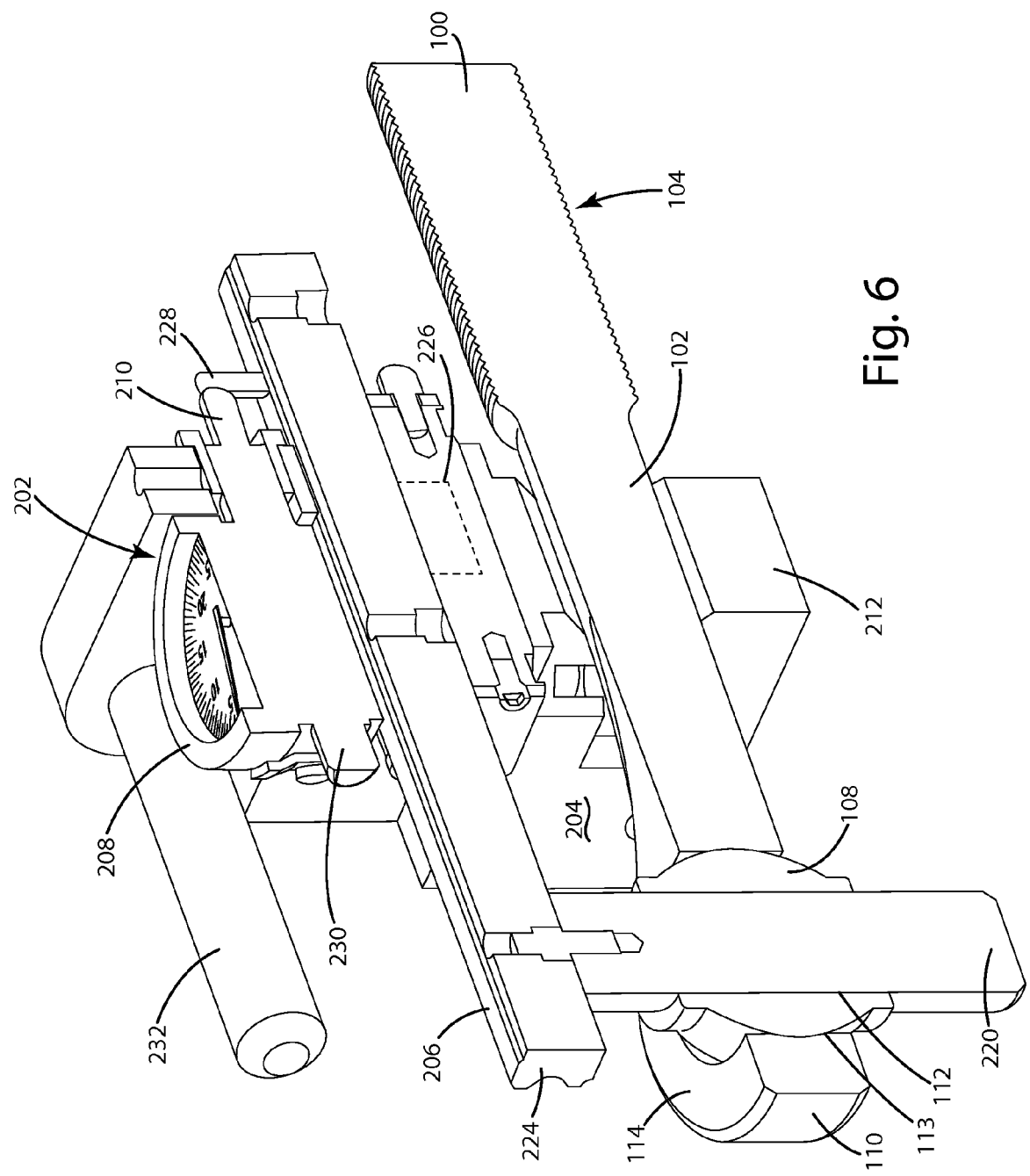
FIG. 6 is a cross-sectional view of the check fixture of FIG. 4 taken along line 6-6 in FIG. 5.
Figure 7:
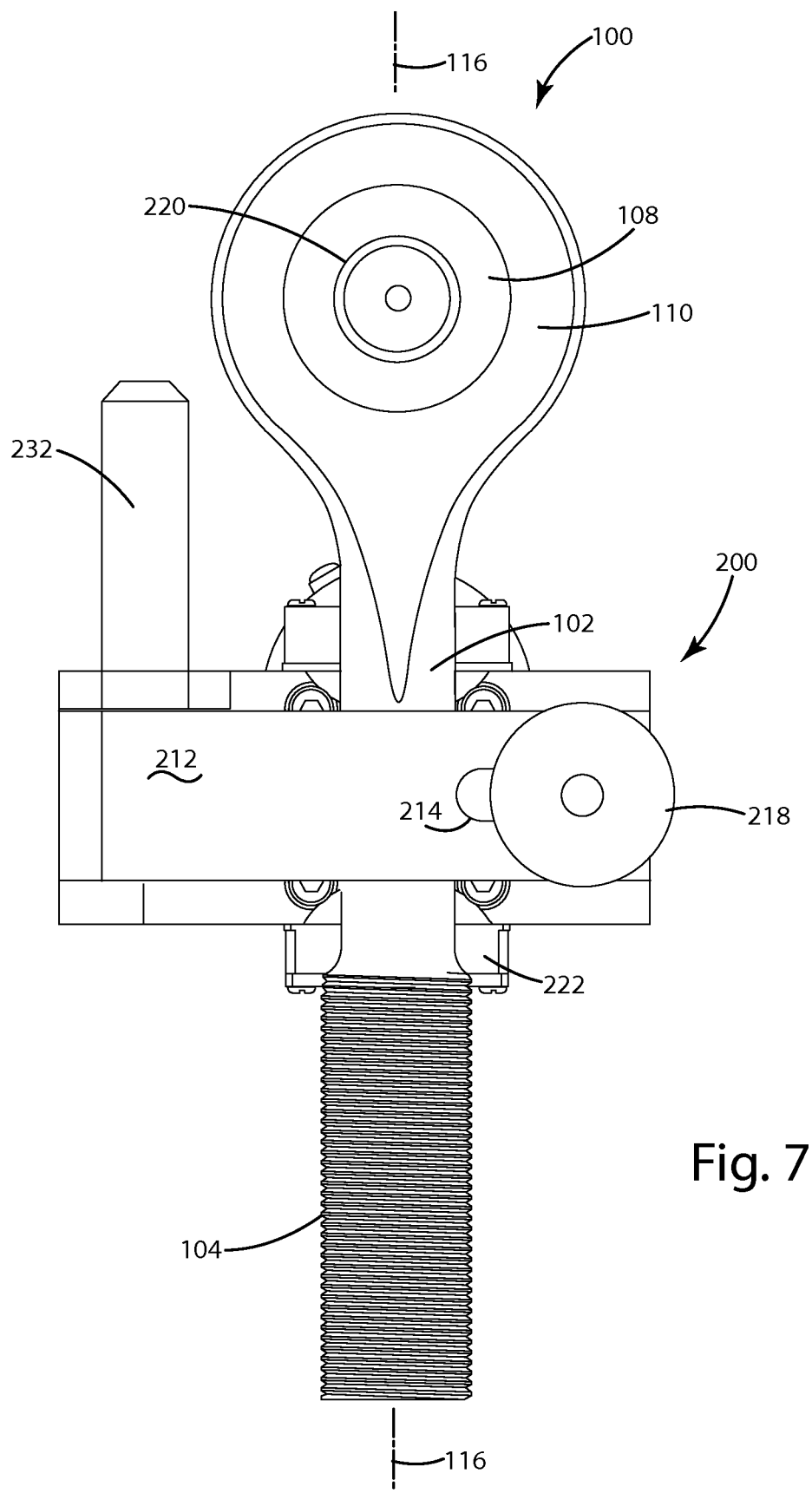
FIG. 7 is a bottom elevational view of the check fixture of FIG. 4.
Figure 8:
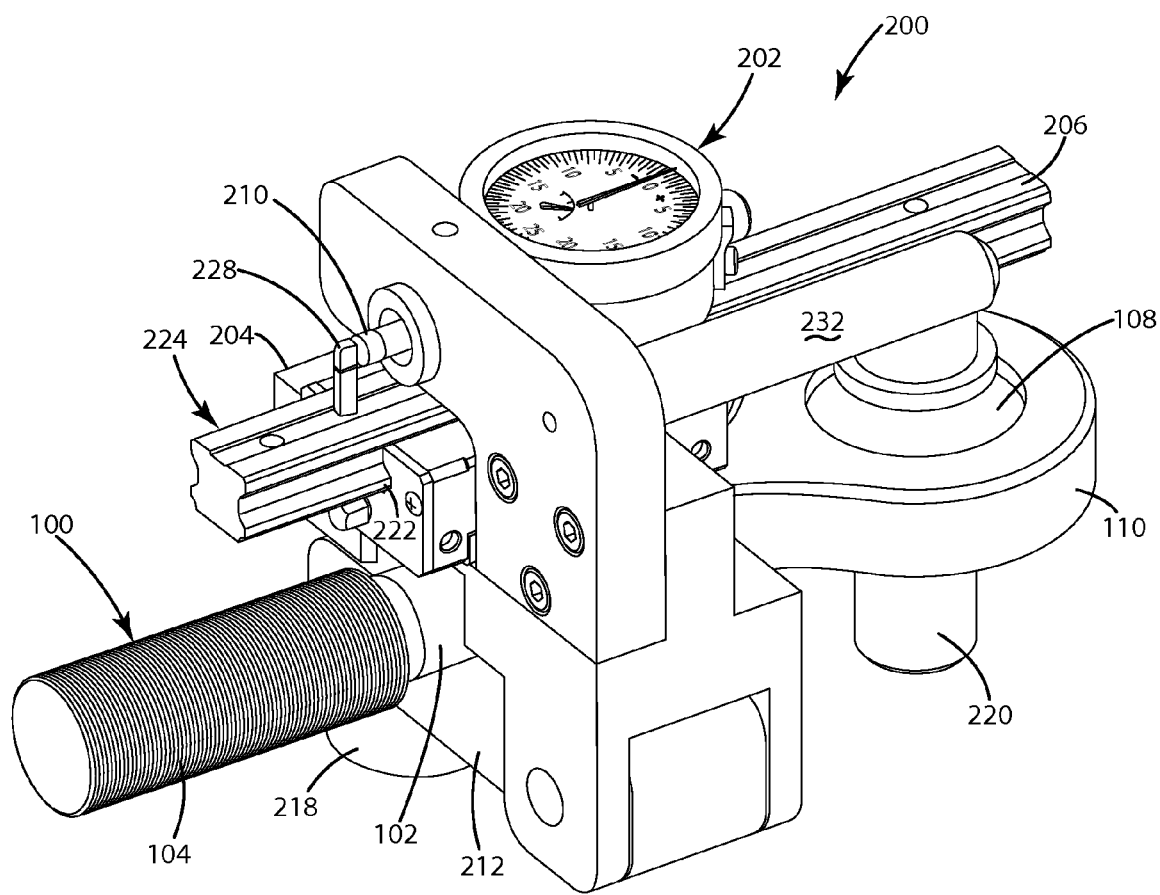
FIG. 8 is a right side perspective view of the check fixture of FIG. 4.
Figure 9:
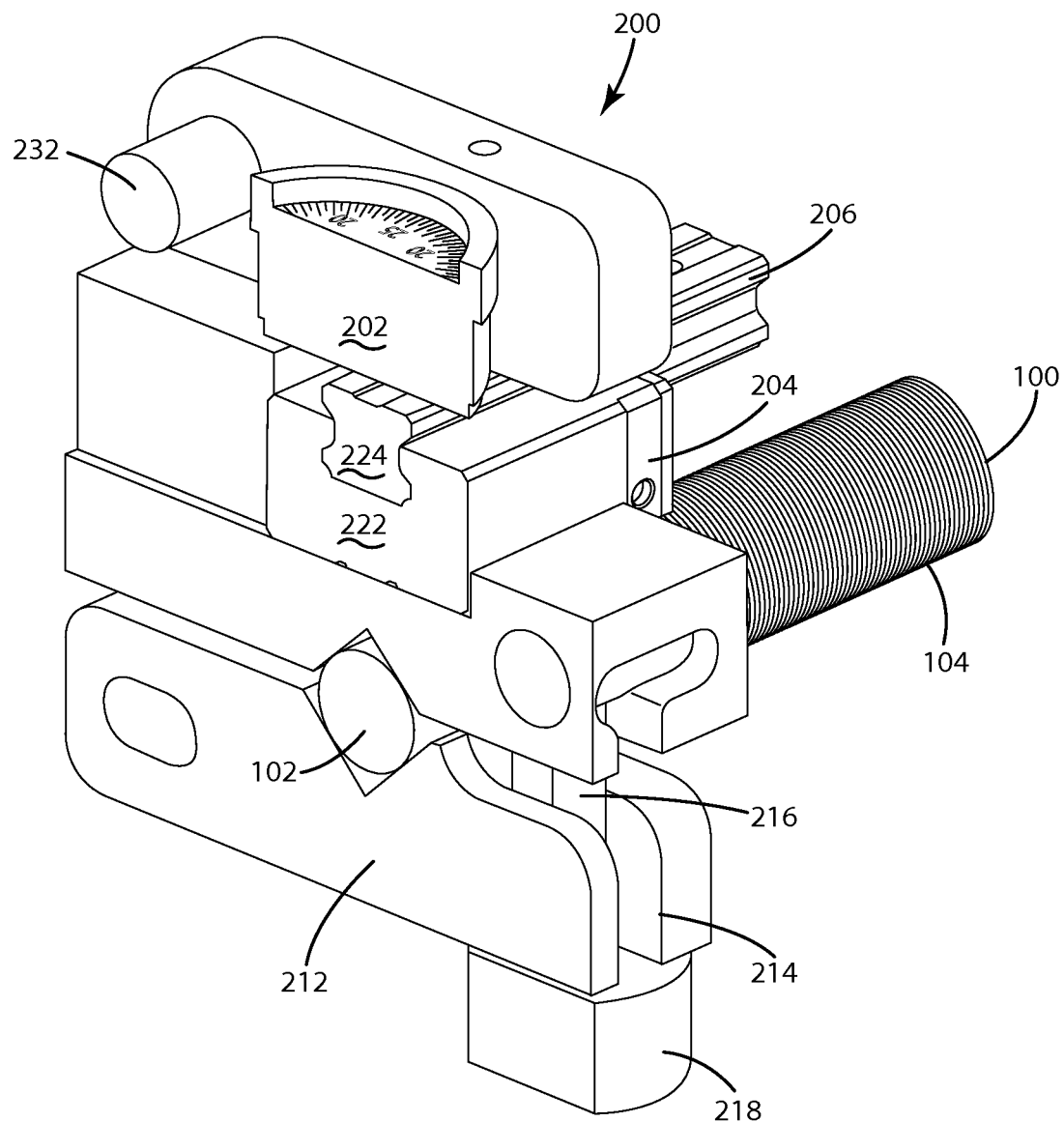
FIG. 9 is a cross-sectional view of the check fixture of FIG. 4 taken along line 9-9 in FIG. 5.

As noted above, the first and second members 204, 206 are generally moveable relative to each other in the radial direction, for example in a direction generally parallel to the pitch change link longitudinal axis 116. The first and second members 204, 206 can optionally include a channel 222 and a rail 224, respectively, to permit relative movement in substantially the radial direction. As shown in FIG. 5 for example, the rail 224 can be coupled between the rod 220 and the gage actuator 210. In addition, the channel 222 can be coupled between the pitch change link stem 102 and the gage body 208. In addition, the first and second members 204, 206 can include a biasing mechanism 226 to urge the second member 206 relative to the first member 204 in a direction generally parallel to the pitch change link longitudinal axis 116. The biasing mechanism 226, shown in phantom in FIG. 6, can be spring actuated or magnetically actuated for example to drive the rail 224 in a direction generally opposite that of the intended test load. For example, if the gage 202 measures inward radial movement, the biasing mechanism 226 may bias the rail 222 radially outward. In corresponding fashion, if the gage 202 measures outward radial movement, the biasing mechanism 226 may bias the rail 222 radially inward.

To reiterate, the first member 204 can be directly or indirectly coupled between the pitch change link stem 102 and the gage body 208, and the second member 206 can be directly or indirectly coupled between the pitch change link ball bearing 108 and the gage actuator 210. This configuration can be reversed or varied in other embodiments. For example, the first member 204 can directly or indirectly coupled between the pitch change link stem 102 and the gage actuator 210, and the second member 206 can be directly or indirectly coupled between the pitch change link ball bearing 108 and the gage body 208. As perhaps best shown in FIG. 8, the rail 224 is operatively coupled to the gage actuator 210 through an attachment arm 228. The attachment arm 228 can extend upwardly from the rail 224, transverse to the rail direction of travel, and can be secured to the actuator 210 through one or more fasteners. As the first and second members 204, 206 move relative to one another, the attachment arm 228, or other suitable device, drives the gage actuator 210 relative to the gage body 208, with the resulting displacement being displayed on the gage 202. While shown in FIGS. 4-9 as including an analog display, the gage 202 can alternatively include a digital display, for example an LCD display. In addition, the gage 202 can optionally include other than a plunger arm 210, and can instead include a lever actuator, a vernier actuator, or other suitable actuator. Further optionally, the check fixture 200 can include a handle 232 extending parallel to the pitch change link longitudinal axis 116 to facilitate transport of the check fixture 200 and to assist in maintaining the check fixture 200 in position during evaluation of a pitch change link 100.

Figure 4:
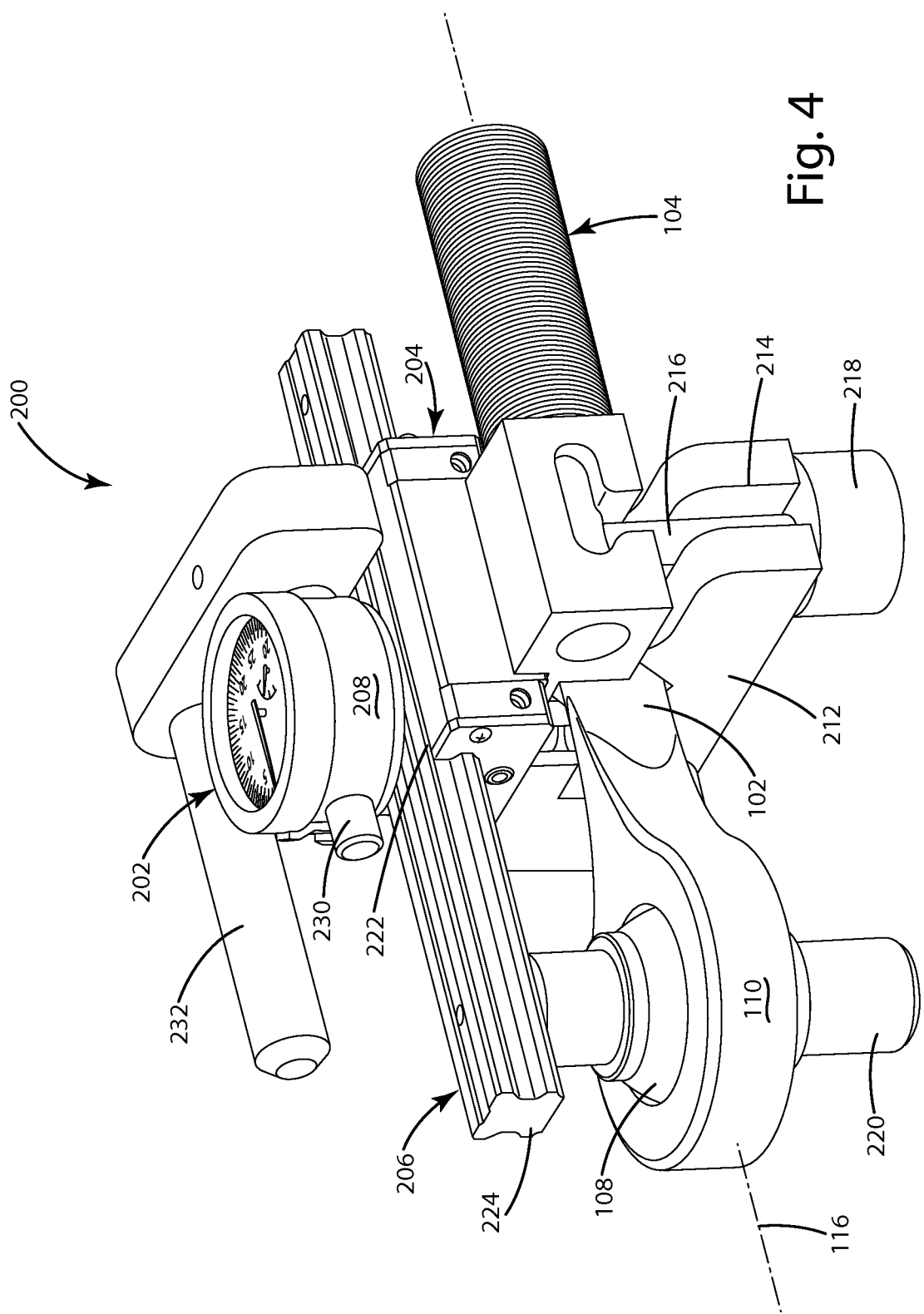
FIG. 4 is a left side perspective view of a check fixture for a pitch change link in accordance with a second embodiment.

A method for evaluating the radial play or clearance between a ball bearing 108 and knuckle 110 can initially include disconnecting the ball socket 106 from the rotor assembly. The check fixture 200 can then be positioned adjacent the pitch change link 100 as generally shown in FIG. 4. For example, the first member 204 can at least partially encompass the pitch change link stem 102 while the rod 220 is guided through the ball bearing aperture 112. To stabilize the check fixture 200 to the pitch change link 100, the attachment arm 212 can be rotated and locked in the closed position, tightly encompassing the pitch change link stem 102. The biasing mechanism 226 can then urge the second member 206 in a direction generally opposite that of the intended test load. For example, the biasing mechanism 226 can urge the second member 206 radially outward away from the threaded end portion 104 to urge the ball bearing 108 into abutment with the outer radial portion of the knuckle 110 or knuckle race 113. Alternatively, the biasing mechanism 226 can urge the second member 206 radially inward toward the threaded end portion 104 to urge the ball bearing 108 into abutment with the inner radial portion of the knuckle 110 or knuckle race 113. In these configurations, the gage 202 can be zeroed, optionally with manipulation of the dial 230. An operator can then apply pressure against the ball bearing 108 in the radial direction, e.g., parallel to the pitch change link longitudinal axis 116 and opposite the biasing load. For example, the operator can apply pressure against the ball bearing 108 in a direction generally toward the threaded end portion 104, while the biasing mechanism 217 urges the ball bearing 108 in a direction generally away from the threaded end portion 104. In response to movement of the ball bearing 108—if any—within the knuckle 110, the second member 206 will slide relative to the first member 204, prompting a displacement of the gage actuator 210. The gage 202, if properly zeroed, can indicate the radial clearance between the ball bearing 108 and the knuckle 110, optionally to displacements on the order of ten-thousandths of an inch (1.0 E-4 inches) or smaller. Once pressure on the ball bearing 108 is released, the biasing mechanism 226 can return the ball bearing 108 into abutment with the opposing radial portion of the knuckle 110 or knuckle race 113. The above steps can be repeated to confirm the proper positioning and alignment of the check fixture 200. If the play or clearance between the ball bearing 108 and the knuckle 110 are determined to be within acceptable levels, the check fixture 200 can be removed from the pitch change link 100 by hand, and the pitch change link 100 can be reconnected to the rotor assembly. Advantageously, the evaluation can be performed while the pitch change link 100 remains otherwise secured to the rotor assembly. The operator can proceed to evaluate one or more of the remaining pitch change links substantially as set forth in the manner above. In a four-bladed articulating rotor assembly, for example, the operator can proceed to evaluate each of the remaining seven pitch change links 100 by disconnecting only the ball socket 106 from the swashplate or the rotor hub. The threaded end portion 104 of each pitch change link 100 can remain connected to the rotor assembly throughout the above process, thereby reducing the labor otherwise used to reconnect both ends of the pitch change link 100.

As used above, directional terminology, including radial/longitudinal, vertical/horizontal, upper/lower, inward/outward and inner/outer, is not intended to limit the present invention, and is instead used for clarity when referring to the accompanying drawings. It is also understood that ordinal terminology (such as "first," "second," "third" and so on) is used merely to indicate a particular feature, so as to distinguish from another feature described by the same term or a similar term. It will be understood that the mere usage of ordinal terminology does not define a numerical limit to the number of features identified.

The above descriptions are those of the current embodiments of the invention. Various alterations and changes can be made without departing from the spirit and broader aspects of the invention as defined in the appended claims, which are to be interpreted in accordance with the principles of patent law including the doctrine of equivalents. Any reference to elements in the singular, for example, using the articles "a," "an," "the," or "said," is not to be construed as limiting the element to the singular.

The invention claimed is:

1. A hand-held check fixture for a pitch change link including a knuckle, a ball bearing, and a stem, the check fixture comprising:
   a first member for attachment to the pitch change link knuckle or adjacent thereto, such that the pitch change link stem remains attached to a rotor assembly;
   a second member for attachment to the pitch change link ball bearing; and
   a gage to indicate movement of the first member relative to the second member, wherein the relative movement corresponds to the axial clearance between the ball bearing and the knuckle, and wherein the pitch change link stem remains attached to the rotor assembly during a measurement of the axial clearance of the pitch change link.

2. The hand-held check fixture of claim 1 wherein the second member includes one or more permanent magnets to releasably join the second member to the pitch change link ball bearing.

3. The hand-held check fixture of claim 1 wherein the ball bearing defines an aperture and the second member includes a downwardly biased portion having a conical head to at least partially interfit within the ball bearing aperture.

4. The hand-held check fixture of claim 1 wherein the first and second members include spaced apart axially polarized magnets to define a repulsive magnetic field therebetween.

5. The hand-held check fixture of claim 4 wherein one of the axially polarized magnets is adapted to magnetically couple to the pitch change link ball bearing.

6. A method for evaluating the play in a pitch change link ball joint including a ball bearing seated within a knuckle, the method comprising:
   providing a check fixture including first and second attachment portions and a gage to indicate relative movement therebetween;
   operatively coupling the first and second attachment portions to the pitch change link knuckle and the pitch change link ball bearing, respectively, while the pitch change link is attached to a rotor assembly; and
   applying pressure against the pitch change link ball bearing to promote movement of the ball bearing in an axial direction against a biasing force, wherein movement of the ball is indicated by the gage.

7. The method of claim 6 wherein the second attachment portion includes one or more permanent magnets to releasably join the second attachment portion to the pitch change link ball bearing.

8. The method of claim 6 wherein the ball bearing defines an aperture and the second attachment portion includes a rod extending through the ball bearing aperture.

9. The method of claim 6 wherein the ball bearing defines an aperture and the second attachment portion includes a downwardly biased conical head to at least partially interfit within the ball bearing aperture.

10. The method of claim 9 wherein the first and second attachment portions include spaced apart axially polarized magnets to define a repulsive magnetic field therebetween.

11. The method of claim 9 wherein the check fixture includes a spring to downwardly bias the second attachment portion to at least partially interfit within the ball bearing aperture.

12. A hand-held check fixture for a pitch change link including a stem defining a longitudinal axis, a knuckle and a ball bearing, the check fixture comprising:
   a first member for attachment to the pitch change link stem;
   a second member for attachment to the ball bearing;
   a biasing element to urge the ball bearing in a first direction parallel to the longitudinal axis and into abutment with the knuckle; and
   an indicator to register movement of the first member relative to the second member in response to a radial load on the ball bearing in a second direction opposite of the first direction, wherein the relative movement corresponds to the radial clearance between the ball bearing and the knuckle, and wherein the indicator is adapted to register the relative movement while the pitch change link stem is attached to a rotor assembly.

13. The hand-held check fixture of claim 12 wherein the ball bearing defines an aperture and the second member includes a rod extending through the ball aperture.

14. The hand-held check fixture of claim 12 wherein the first member includes a pivotable attachment arm adapted to releasably secure the check fixture to the pitch change link stem.

15. The hand-held check fixture of claim 12 wherein:
   the indicator includes a main body portion and an actuator; and
   the first member is fixed in relation to the gage main body portion and the second member is fixed in relation to the actuator.

16. The hand-held check fixture of claim 12 wherein the first and second members are slideably engaged with each other in a direction generally parallel to the pitch change link stem.

17. The hand-held check fixture of claim 16 wherein the biasing element is adapted to promote movement of the first member relative to the second member in a direction generally opposite of the radial load.

* * * * *